US012775503B2

(12) United States Patent
Yarabolu

(10) Patent No.: US 12,775,503 B2
(45) Date of Patent: Oct. 27, 2026

(54) REDUCING APPLICATION CARBON FOOTPRINTS USING PREDICTIVE LOAD BALANCING AND ADAPTIVE PROCESS SCALING

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 245 days.

(21) Appl. No.: 18/680,426

(22) Filed: May 31, 2024

(65) Prior Publication Data

US 2025/0370819 A1 Dec. 4, 2025

(51) Int. Cl.

| | |
|---|---|
| ***G06F 9/46*** | (2006.01) |
| ***G06F 9/50*** | (2006.01) |
| *G06Q 30/018* | (2023.01) |

(52) U.S. Cl.
CPC ........... *G06F 9/505* (2013.01); *G06Q 30/018* (2013.01)

(58) Field of Classification Search
CPC .............................. G06F 9/505; G06Q 30/018
See application file for complete search history.

(56) References Cited

U.S. PATENT DOCUMENTS

| | | | |
|---|---|---|---|
| 9,207,993 | B2 | 12/2015 | Jain |
| 11,201,901 | B2 | 12/2021 | Klejsa et al. |
| 11,900,047 | B1 | 2/2024 | Seth |
| 11,945,445 | B1 | 4/2024 | Maleitzke |
| 11,997,018 | B2 | 5/2024 | Bartholomew et al. |
| 2020/0027096 | A1 | 1/2020 | Cooner |
| 2021/0241392 | A1 | 8/2021 | Tiwari et al. |
| 2021/0319408 | A1 | 10/2021 | Jorasch et al. |
| 2022/0036302 | A1 | 2/2022 | Cella et al. |
| 2023/0123322 | A1 | 4/2023 | Cella et al. |
| 2023/0162123 | A1 | 5/2023 | Kagan |
| 2023/0289819 | A1 | 9/2023 | Balasubramanian et al. |
| 2024/0023028 | A1 | 1/2024 | Nikopour et al. |
| 2024/0103743 | A1 | 3/2024 | Guim Bernat et al. |
| 2024/0127155 | A1 | 4/2024 | Hazazi et al. |
| 2024/0129380 | A1 | 4/2024 | Ganju et al. |
| 2024/0143055 | A1 | 5/2024 | Kondapi et al. |
| 2024/0144141 | A1 | 5/2024 | Cella et al. |
| 2024/0157561 | A1 | 5/2024 | D'Amelio |
| 2024/0160546 | A1 | 5/2024 | Mazile et al. |

*Primary Examiner* — Gregory A Kessler
(74) *Attorney, Agent, or Firm* — Banner & Witcoff, Ltd.

(57) ABSTRACT

Aspects related to reducing application carbon footprints using predictive load balancing and adaptive process scaling are provided. An adaptive scaling platform may train a delegation model to output event pools based on input of event processing traffic information. The platform may receive event processing traffic information. The platform may generate an event pool using the delegation model. The event pool may comprise tasks required to fulfill event processing requests corresponding to the event processing traffic information and indicators of applications corresponding to the plurality of tasks. The platform may receive event processing information from a server. The platform may cause, based on the event processing information, an application to identify thread requirements. The computing platform may allocate resources based on the thread requirements. The computing platform may delegate tasks to the threads based on the allocating. The platform may update the delegation model based on monitoring the threads.

20 Claims, 12 Drawing Sheets

300

REDUCING APPLICATION CARBON FOOTPRINTS USING PREDICTIVE LOAD BALANCING AND ADAPTIVE PROCESS SCALING

BACKGROUND

Aspects described herein are related to reducing application carbon footprints using predictive load balancing and adaptive process scaling. In some instances, entities such as an enterprise organization (e.g., a financial institution, and/or other institutions) may utilize a plurality of software applications to fulfill event processing requests and/or to perform other functions. In some examples, such software applications may comprise process intensive software applications that consume a significant amount of energy and/or other resources and, consequently, impact the environment (e.g., by increasing the carbon footprint of the enterprise organization). Conventional systems typically allocate memory for processing software applications as soon as the application is launched. In these examples the allocated memory is static and applications might not utilize all of the allocated memory, resulting in waste. Dynamic memory allocation is possible, but conventional dynamic memory allocation increases computation time and thus energy consumption when executing the application, increasing the carbon footprint. In some examples, conventional systems seeking to reduce the carbon footprint of software applications may perform reactive load balancing to distribute resources. However, such reactive methods do not prevent waste from initially occurring. Thus, there exists a need for a predictive method of load balancing that improves the efficiency of resource allocation while simultaneously reducing the carbon footprints of applications.

SUMMARY

Aspects of the disclosure provide effective, efficient, scalable, and convenient technical solutions that address and overcome the technical problems associated with current methods of reducing application carbon footprint. In accordance with one or more arrangements of the disclosure, a computing platform with at least one processor, a communication interface, and memory storing computer-readable instructions may train a delegation model based on historical event processing information. Training the delegation model may configure the delegation model to output event pools based on input of event processing traffic information. The computing platform may receive event processing traffic information from a user device. The computing platform may generate an event pool based on inputting the event processing traffic information into the delegation model. The event pool may comprise a plurality of tasks required to fulfill one or more event processing requests corresponding to the event processing traffic information. The event pool may additionally or alternatively comprise a plurality of indicators of applications corresponding to the plurality of tasks. The computing platform may receive an event processing request, an indication of an application corresponding to the event processing request, and event pool information corresponding to the event processing request from a server. The computing platform may cause, based on inputting the event pool information into the application, the application to identify one or more thread requirements. The computing platform may allocate, based on the one or more thread requirements, resources to one or more threads. The computing platform my delegate, based on the allocating, at least one task of the plurality of tasks. The computing platform may update, based on monitoring the one or more threads, the delegation model.

In one or more examples, generating the event pool may comprise generating, using the delegation model and based on the event processing traffic information, predicted load information. Generating the event pool may also comprise identifying, based on the predicted load information, a plurality of applications for fulfilling the one or more event processing requests. In one or more arrangements, the computing platform may embed, in the application corresponding to the event processing request, an artificial intelligence listener component. The computing platform may cause, based on the historical event processing information, the application to train the artificial intelligence listener component to output thread requirements based on input of event pool information. Causing the application to identify the one or more thread requirements may comprise inputting the event pool information into the artificial intelligence listener component.

In one or more examples, the computing platform may identify, based on the monitoring the one or more threads, a status for at least one thread of the one or more threads. The status may indicate whether the at least one thread is active and whether the at least one thread comprises unused resources. The computing platform may, based on identifying that the at least one thread is active and comprises unused resources, resize the at least one thread and/or may, based on identifying that the at least one thread is inactive, dispose of one or more resources corresponding to the at least one thread. In one or more arrangements, resizing the at least one thread may comprise modifying an amount of memory allocated to the at least one thread. In one or more examples, identifying the status for the at least one thread may comprise identifying whether the at least one thread corresponds to any pending tasks and identifying a percentage of allocated memory of the at least one thread that is being used to perform a task In one or more arrangements, the serve may correspond to an adaptive process scaling service. In one or more examples, the computing platform may generate, based on monitoring the one or more threads, energy efficiency information corresponding to the delegation model. In these examples, updating the delegation model may comprise updating the delegation model based on the energy efficiency information. In one or more arrangements, the computing platform may output, to a second user device, an energy efficiency interface. The energy efficiency interface may comprise energy efficiency information corresponding to the delegation model. In one or more examples, the computing platform may store the event pool to a process scaling database. The process scaling database may be a component of a different computing platform. In one or more arrangements, the one or more thread requirements may comprise memory allocation information corresponding to the at least one task.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
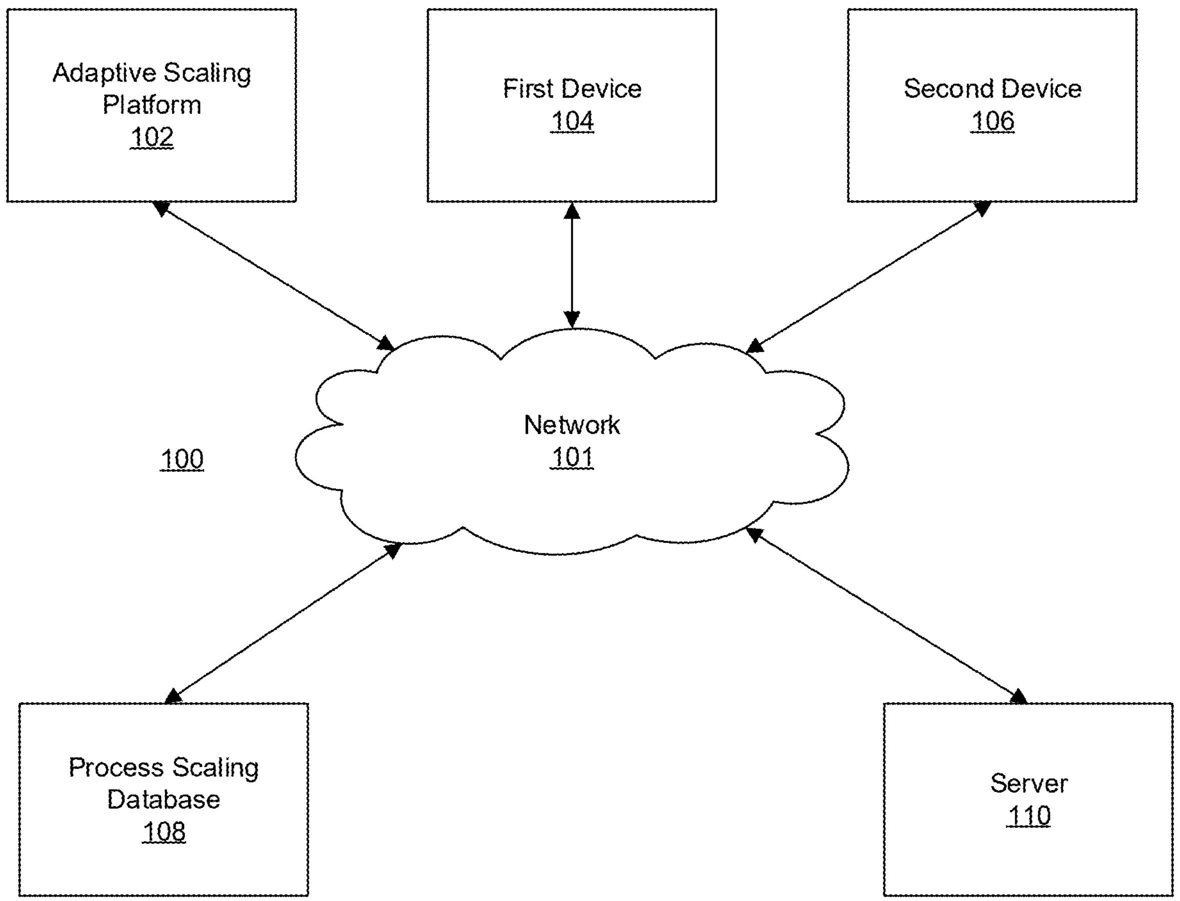
FIGS. 1A-1B depict an illustrative computing environment for reducing application carbon footprints using predictive load balancing and adaptive process scaling in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to reducing application carbon footprints using predictive load balancing and adaptive process scaling. In some instances, entities such as an enterprise organization (e.g., a financial institution, and/or other institutions) may utilize a plurality of software applications to fulfill event processing requests and/or to perform other functions. In some examples, such software applications may comprise process intensive software applications. Such applications consume more energy than other applications and thus have a greater impact on climate and/or other environmental concerns. However, conventional methods of load balancing and process scaling do not address the greater carbon footprint of such process intensive software applications. For example, conventional systems typically allocate memory for processing software applications in a static manner, allocating memory as soon as the application is launched and/or otherwise initialized. Static memory allocation leads to waste because at any given time portions of the allocated memory might not be used (e.g., if the tasks performed by the application requires less than the total amount of memory allocated for the task). Attempts to solve the issues associated with static memory allocation typically rely on dynamic memory allocation, but conventional dynamic memory allocation increases computation time and thus energy consumption when executing the application, increasing the carbon footprint. Thus, there exists a need for a predictive method of load balancing that improves the efficiency of resource allocation while simultaneously reducing the carbon footprints of applications.

Accordingly, in some instances, entities such as an enterprise organization (e.g., a financial institution, and/or other organizations/institutions) may deploy, maintain, and/or otherwise utilize an adaptive scaling platform as described herein. The adaptive scaling platform may utilize methods of predictive load balancing and adaptive process scaling to scale applications dynamically such that no allocated memory is left unutilized. The adaptive scaling platform may receive event processing traffic information (e.g., a plurality of event processing requests such as transaction requests, access requests, or the like, indicators of applications required to fulfill one or more event processing requests, and/or other event processing traffic information). The adaptive scaling platform may use information of historical event processing traffic loads to analyze the event processing traffic information and predict loads (i.e., resource requirements, or the like) for applications corresponding to the event processing traffic information. The adaptive scaling platform may, based on the predicted loads, generate an event pool for use in adaptive scaling of applications. The event pool may comprise a database, a document, a table, and/or other records of information that may be used for adaptive scaling of applications. For example, the event pool may comprise a record of a tasks required to fulfill one or more event processing requests, and indicators of applications corresponding to the tasks.

In some examples, the adaptive scaling platform may coordinate with one or more additional and/or third party devices to perform methods of reducing application carbon footprints using predictive load balancing and adaptive process scaling as described herein. For example, the adaptive scaling platform may upload and/or otherwise make accessible the event pool to a server configured to assist with adaptive scaling of applications. The server may use the event pool to identify applications and pair them with event processing requests. The server may provide the event pool information and the identified applications to the adaptive scaling platform for use in allocating memory and adaptively scaling the applications to fulfill the event processing requests. The adaptive scaling platform may cause an application corresponding to an event processing request to identify thread (e.g., units of programmed instructions, or the like) requirements. For example, the adaptive scaling platform may cause an artificial intelligence component of the application to identify memory requirements, central processing unit (CPU) requirements, and/or other thread requirements for fulfilling event processing requests using the application. Based on the thread requirements, the adaptive scaling platform may allocate resources (e.g., memory, and/or other resources) to the threads and delegate, based on the allocated, tasks for fulfilling the event processing requests. The adaptive scaling platform may facilitate adaptive scaling by monitoring the threads to identify their status and, based on the status of each thread, scale the memory allocation to conserve unused memory.

In some examples, in performing the methods of deploying and/or utilizing the adaptive scaling platform as described herein, the adaptive scaling platform may train one or more machine learning models. For example, the adaptive scaling platform may train a delegation model based on historical event processing information (e.g., historical event traffic information) from historical event processing requests. Training the delegation model may configure the delegation model to generate the predicted loads and/or the event pools, as described herein.

These and various other aspects will be discussed more fully herein.

Figure 1B:
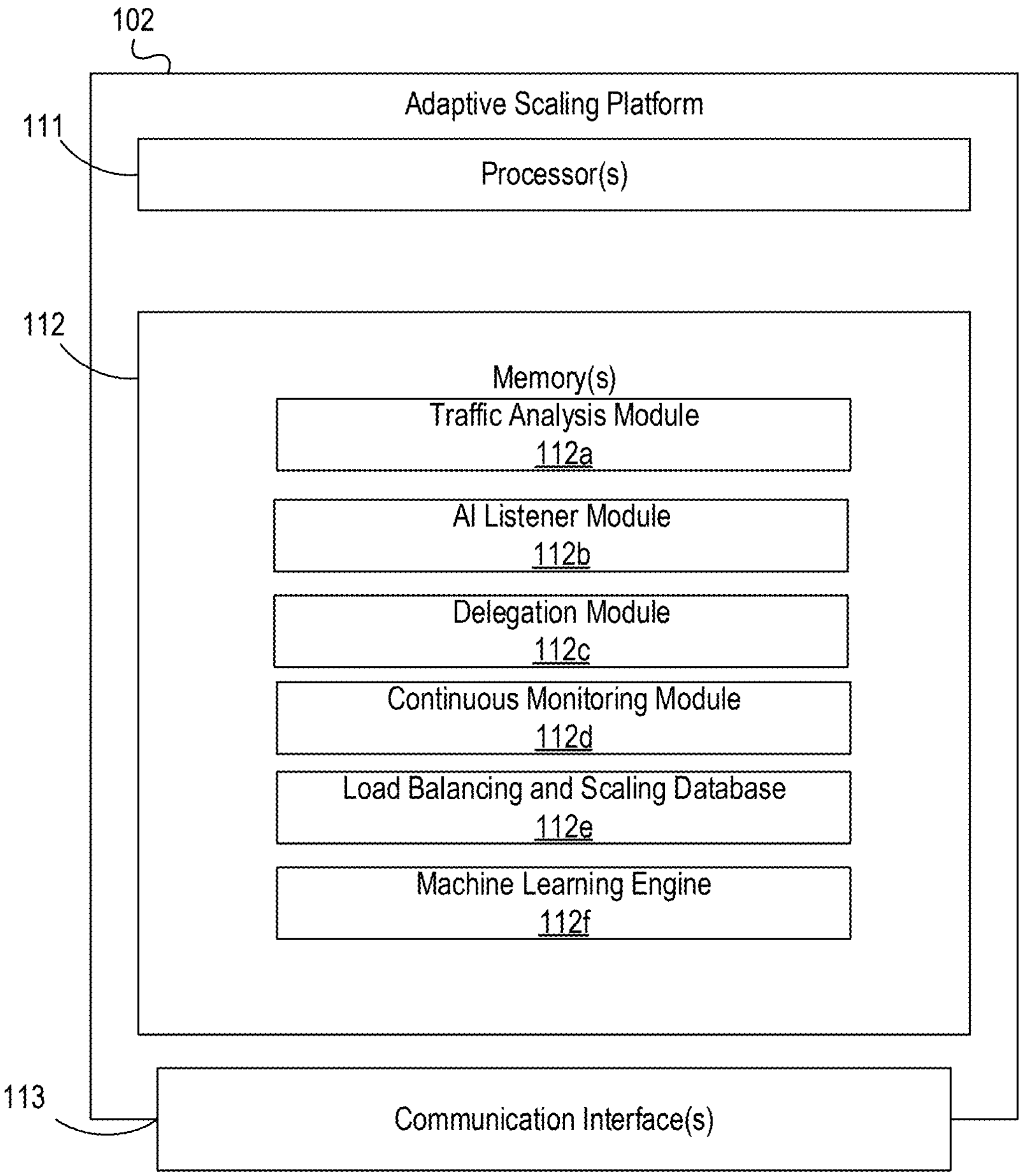

FIGS. 1A-1B depict an illustrative computing environment for reducing application carbon footprints using predictive load balancing and adaptive process scaling in accordance with one or more example arrangements. Referring to FIG. 1A, computing environment 100 may include one or more computer systems. For example, computing environment 100 may include an adaptive scaling platform 102, a first device 104, a second device 106, a process scaling database 108, a server 110, and/or other computer systems.

As described further below, adaptive scaling platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train, and/or execute one or more machine learning models (e.g., a delegation model, and/or other models). For example, the adaptive scaling platform 102 may train a delegation model to output event pools, predictive loads, and/or other information. The adaptive scaling platform 102 may be managed by and/or otherwise associated with an enterprise organization (e.g., a financial institution, and/or other institutions) that may, e.g., be associated with one or more additional systems (e.g., first device 104, second device 106, process scaling database 108, server 110, and/or other systems). In one or more instances, the adaptive scaling platform 102 may be configured to communicate with one or more systems (e.g., first device 104, second device 106, process scaling database 108, server 110, and/or other systems) to perform an information transfer, generate predicted loads for event processing requests, generate event pools, train artificial intelligence models and/or components of applications, identify thread requirements, allocate resources, delegate tasks, generate energy efficiency information, display a user interface, and/or perform other functions.

The first device 104 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., generate event processing requests and/or traffic information, and/or other functions). In some examples, the first device 104 may be associated with a particular user (e.g., an employee and/or a customer of the enterprise organization). In some instances, the first device 104 may be configured to communicate with one or more systems (e.g., adaptive scaling platform 102, and/or other systems) as part of transmitting a message, sending an event processing request, and/or to perform other functions.

The second device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other functions (e.g., display a user interface, and/or other functions). For example, the second device 106 may be a computing device similar to the first device 104. In some examples, the second device 106 may be associated with a particular entity and/or organization (e.g., financial institutions, administrative/regulatory entities, and/or other entities/organizations). In some instances, the second device 106 may be configured to communicate with one or more systems (e.g., adaptive scaling platform 102, and/or other systems) as part of transmitting a message, displaying a user interface, and/or to perform other functions. In some instances, the second device 106 may be configured to display one or more graphical user interfaces (e.g., energy efficiency interfaces, and/or other interfaces).

Although two similar devices (first device 104 and second device 106) are depicted herein, any number of such devices may be used to implement the methods and arrangements described herein without departing from the scope of the disclosure.

The process scaling database 108 may be and/or otherwise include one or more computing devices (e.g., servers, server blades, and/or other devices) and/or other computer components (e.g., processors, memories, communication interfaces) that may be used to create, host, modify, and/or otherwise validate an organized collection of information (e.g., a regional database). The first device 104 may be synchronized across multiple nodes (e.g., sites, institutions, geographical locations, and/or other nodes) and may be accessible by multiple users (who may, e.g., be employees of an enterprise organization such as a financial institution). The information stored at the process scaling database 108 may include information used to train machine learning models and/or components (e.g., historical request information and/or log files corresponding to historical event processing requests, or the like), event pools (e.g., information corresponding to a plurality of event processing requests, such as predicted loads, preferred applications for executing requests, or the like) and/or any additional information. In some instances, the process scaling database 108 may be accessed by, validated by, and/or modified by any of, adaptive scaling platform 102, server 110, and/or other devices. Although shown as an independent database, in some instances, the process scaling database 108 may be part of and/or otherwise integrated into the adaptive scaling platform 102 without departing from the scope of the disclosure.

The server 110 may be and/or otherwise include one or more computing devices (e.g., servers, server blades, and/or other devices) and/or other computer components (e.g., processors, memories, communication interfaces) that may be used to provide resources, information, programs, applications, and/or other services to one or more computing devices (e.g., adaptive scaling platform 102, and/or other computing devices). The server 110 may be managed by and/or otherwise associated with an entity (e.g., the enterprise organization corresponding to adaptive scaling platform 102, a third party organization associated with the enterprise organization corresponding to the adaptive scaling platform 102, and/or other entities) providing web-based services. The server 110 may, for example, be configured to provide a web-based service such as an adaptive process scaling service (e.g., a service structured to operate with adaptive scaling platform 102 to reduce application carbon footprints as described herein), or the like. The server 110 may be configured to access and/or maintain a pool of applications configured to assist in fulfilling event processing requests.

Computing environment 100 also may include one or more networks, which may interconnect adaptive scaling platform 102, first device 104, second device 106, process scaling database 108, and server 110. For example, computing environment 100 may include a network 101 (which may interconnect, e.g., adaptive scaling platform 102, first device 104, second device 106, process scaling database 108, and server 110).

In one or more arrangements, adaptive scaling platform 102, first device 104, second device 106, process scaling database 108, and server 110 may be any type of computing device capable of sending and/or receiving requests and processing the requests accordingly. For example, adaptive scaling platform 102, first device 104, second device 106, process scaling database 108, server 110 and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of adaptive scaling platform 102, first device 104, second device 106, process scaling database 108, and server 110 may, in some instances, be special-purpose computing devices configured to perform specific functions.

Referring to FIG. 1B, adaptive scaling platform 102 may include one or more processors 111, memory 112, and communication interface 113. A data bus may interconnect processors 111, memory 112, and communication interface 113. Communication interface 113 may be a network interface configured to support communication between adaptive scaling platform 102 and one or more networks (e.g., network 101, or the like). Communication interface 113 may be communicatively coupled to the processors 111. Memory 112 may include one or more program modules having instructions that, when executed by processors 111, cause adaptive scaling platform 102 to perform one or more functions described herein, and/or one or more databases (e.g., a load balancing and scaling database 112*e*, or the like) that may store and/or otherwise maintain information which may be used by such program modules and/or processors 111. In some instances, the one or more program modules and/or databases may be stored by and/or maintained in different memory units of adaptive scaling platform 102 and/or by different computing devices that may form and/or otherwise make up adaptive scaling platform 102. For example, memory 112 may have, host, store, and/or include a traffic analysis module 112*a*, an artificial intelligence (AI) listener module 112*b*, a delegation module 112*c*, a continuous monitoring module 112*d*, a load balancing and scaling database 112*e*, a machine learning engine 112*f*, and/or other modules and/or databases.

Traffic analysis module 112*a* may have instructions that direct and/or cause adaptive scaling platform 102 to receive historical event processing requests/log information, receive event processing traffic information, generate predicted load information, generate event pools, and/or perform other functions. AI listener module 112*b* may have instructions that direct and/or cause adaptive scaling platform 102 to cause training of AI components of applications, cause identification of thread requirements, and/or perform other functions. Delegation module 112*c* may have instructions that direct and/or cause adaptive scaling platform 102 to allocate resources to applications and/or threads, delegate tasks for fulfilling event processing requests to one or more applications, and/or perform other functions. Continuous monitoring module 112*d* may have instructions that direct and/or cause adaptive scaling platform 102 to monitor threads, identify statuses of threads, update threads, generate efficiency information, and/or perform other functions. Load balancing and scaling database 112*e* may have instructions causing adaptive scaling platform 102 to store correlations used to train machine learning models, information described herein with respect to process scaling database 108, and/or other information. Machine learning engine 112*f* may have instructions to train, implement, and/or update one or more machine learning models, such as a delegation model, and/or other machine learning models.

Although traffic analysis module 112*a*, AI listener module 112*b*, delegation module 112*c*, continuous monitoring module 112*d*, load balancing and scaling database 112*e*, and machine learning engine 112*f* are depicted as separate modules herein, the instructions stored by these modules may be stored in any number of modules without departing from the scope of this disclosure.

Figure 2A:
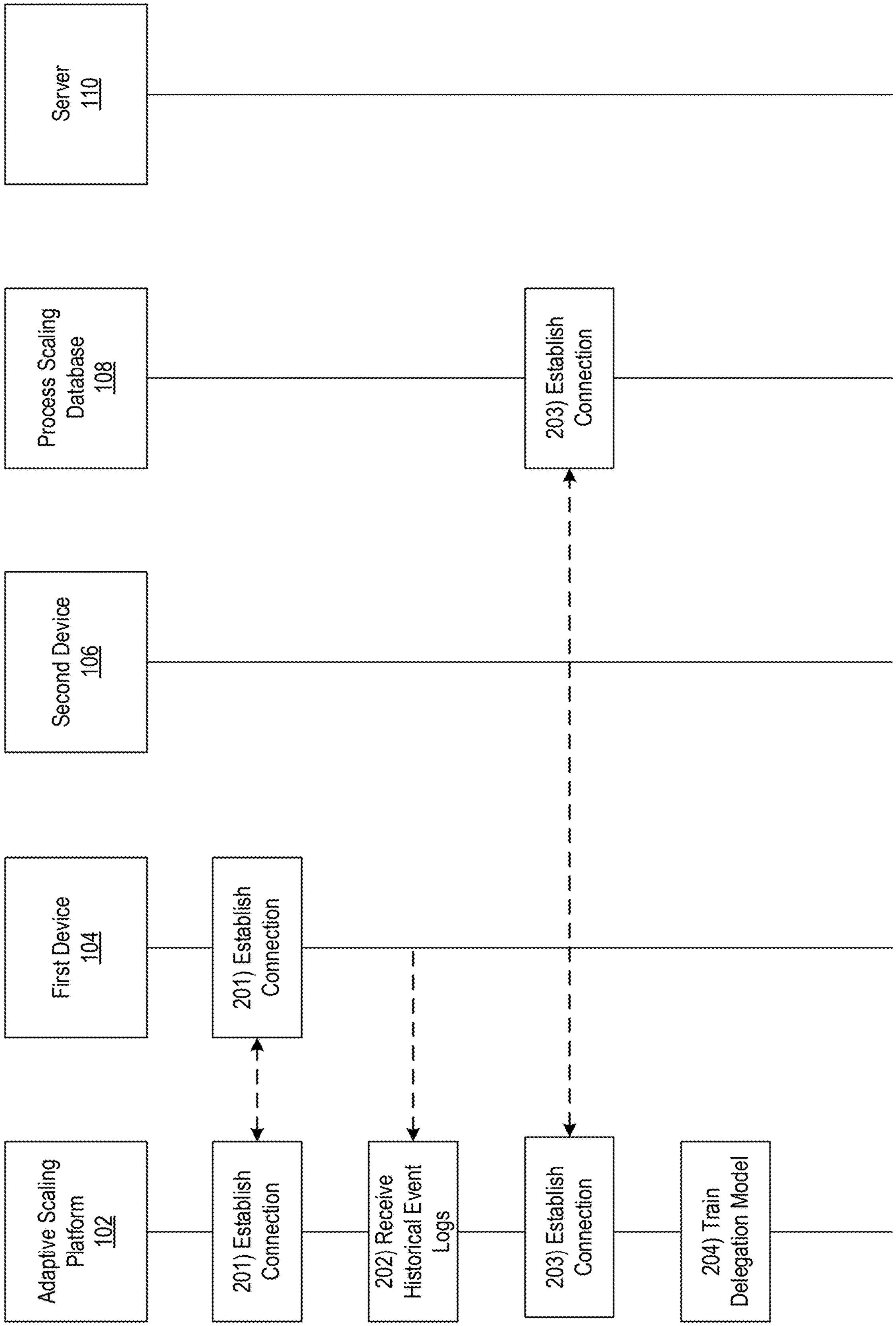
FIGS. 2A-2G depict an illustrative event sequence for reducing application carbon footprints using predictive load balancing and adaptive process scaling in accordance with one or more example arrangements.

FIGS. 2A-2G depict an illustrative event sequence for reducing application carbon footprints using predictive load balancing and adaptive process scaling in accordance with one or more example arrangements. Referring to FIG. 2A, at step 201, the adaptive scaling platform 102 may establish a connection with the first device 104. For example, the adaptive scaling platform 102 may establish a first wireless data connection with the first device 104 to link the first device 104 with the adaptive scaling platform 102 (e.g., in preparation for receiving event processing requests, receiving historical event processing information and/or event logs, and/or other functions). In some instances, the adaptive scaling platform 102 may identify whether or not a connection is already established with the first device 104. If a connection is already established with the first device 104, the adaptive scaling platform 102 might not re-establish the connection. If a connection is not yet established with the first device 104, the adaptive scaling platform 102 may establish the first wireless data connection as described herein.

At step 202, the adaptive scaling platform 102 may receive historical event processing logs from the first device 104. For example, the adaptive scaling platform 102 may receive the historical event processing logs via the communication interface 113 and while the first wireless data connection is established. In some examples, the historical event processing logs may comprise historical event processing information from one or more historical event processing requests. For example, the historical event processing logs may comprise information such as indications of one or more tasks corresponding to the historical event processing requests, indications of applications used to fulfill the historical event processing requests, load balancing information such as indications of resources (e.g., memory, central processing unit (CPU) usage, and/or other resources) used to fulfill the historical event processing request and/or other information, energy efficiency information corresponding to the historical event processing requests, and/or other information.

At step 203, the adaptive scaling platform 102 may establish a connection with the process scaling database 108. For example, the adaptive scaling platform 102 may establish a second wireless data connection with the process scaling database 108 to link the process scaling database 108 with the adaptive scaling platform 102 (e.g., in preparation for storing historical event processing information, accessing additional historical event processing information, storing event pools, and/or other functions). In some instances, the adaptive scaling platform 102 may identify whether or not a connection is already established with the process scaling database 108. If a connection is already established with the process scaling database 108, the adaptive scaling platform 102 might not re-establish the connection. If a connection is not yet established with the process scaling database 108, the adaptive scaling platform 102 may establish the second wireless data connection as described herein. In some examples, the process scaling database 108 may be and/or comprise a component (e.g., load balancing and scaling database 112*e*, or the like) of the adaptive scaling platform 102. In these examples, the adaptive scaling platform 102 might not establish a connection with the process scaling database 108 and may proceed to step 204.

At step 204, the adaptive scaling platform 102 may train a machine learning model. The adaptive scaling platform 102 may, for example, train a delegation model configured to output event pools and/or predicted load information based on input of event processing traffic information. In some instances, the adaptive scaling platform 102 may configure and/or otherwise train the delegation model based on historical event processing information. For example, the adaptive scaling platform 102 may configure and/or otherwise train the delegation model based on historical event processing information corresponding to requests that were fulfilled using conventional load balancing techniques, in order to train the model to identify predicted load information and/or to identify optimal resource allocation for specific tasks corresponding to historical event processing requests. In some examples, the historical event processing information may be and/or comprise the historical event processing information received at step 202. Additionally or alternatively, in some examples, the historical event processing information may be and/or comprise historical event processing information previously stored at the process scaling database 108 (e.g., for training machine learning models) and accessed by the adaptive scaling platform 102.

In some instances, to configure and/or otherwise train the delegation model, the adaptive scaling platform 102 may cause the delegation model to process the historical event processing information by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

In some examples, in configuring and/or otherwise training the delegation model, the adaptive scaling platform 102 may cause the delegation model to store one or more correlations between portions of the historical event processing information. In some arrangements, for example, the adaptive scaling platform 102 may cause the delegation model to store one or more correlations between historical event processing requests and historical load balancing information. For example, the adaptive scaling platform 102 may cause the delegation model to store correlations between information of the historical event processing requests (e.g., the tasks associated with fulfilling a historical event processing request, the applications required to fulfill a historical event processing request, the nature of a historical event processing request (e.g., the source of the request, a timeframe for the request, and/or other parameters of the event processing request), and/or other information of the historical event processing requests) and load balancing information such as the amount of resources (e.g., memory, CPU usage, or the like) allocated to fulfill the historical event processing requests, and/or other load balancing information.

In configuring and/or otherwise training the delegation model, based on causing the delegation model to store the one or more correlations, the adaptive scaling platform 102 may cause the delegation model to output event pools and/or predicted load information based on input of event processing traffic information. For example, the adaptive scaling platform 102 may configure and/or otherwise train the delegation model to output predicted load information for an event processing request based on the stored correlations. The delegation model may be configured and/or otherwise trained to, based on the stored correlations, output a predicted load (e.g., an amount of memory required to fulfill an event processing request, and/or other load information) for an event processing request that is similar to a historical event processing request corresponding to a stored correlation. Additionally and/or alternatively, the delegation model may be configured and/or otherwise trained to, based on the stored correlations, generate an event pool comprising tasks required to fulfill an event processing request and indicators of applications corresponding to the tasks. For example, the delegation model may be configured and/or otherwise trained to generate an event pool comprising similar tasks and indicators of applications for an event processing request based on identifying, via the one or more stored correlations, a historical event processing request corresponding to the event processing request.

Figure 2B:
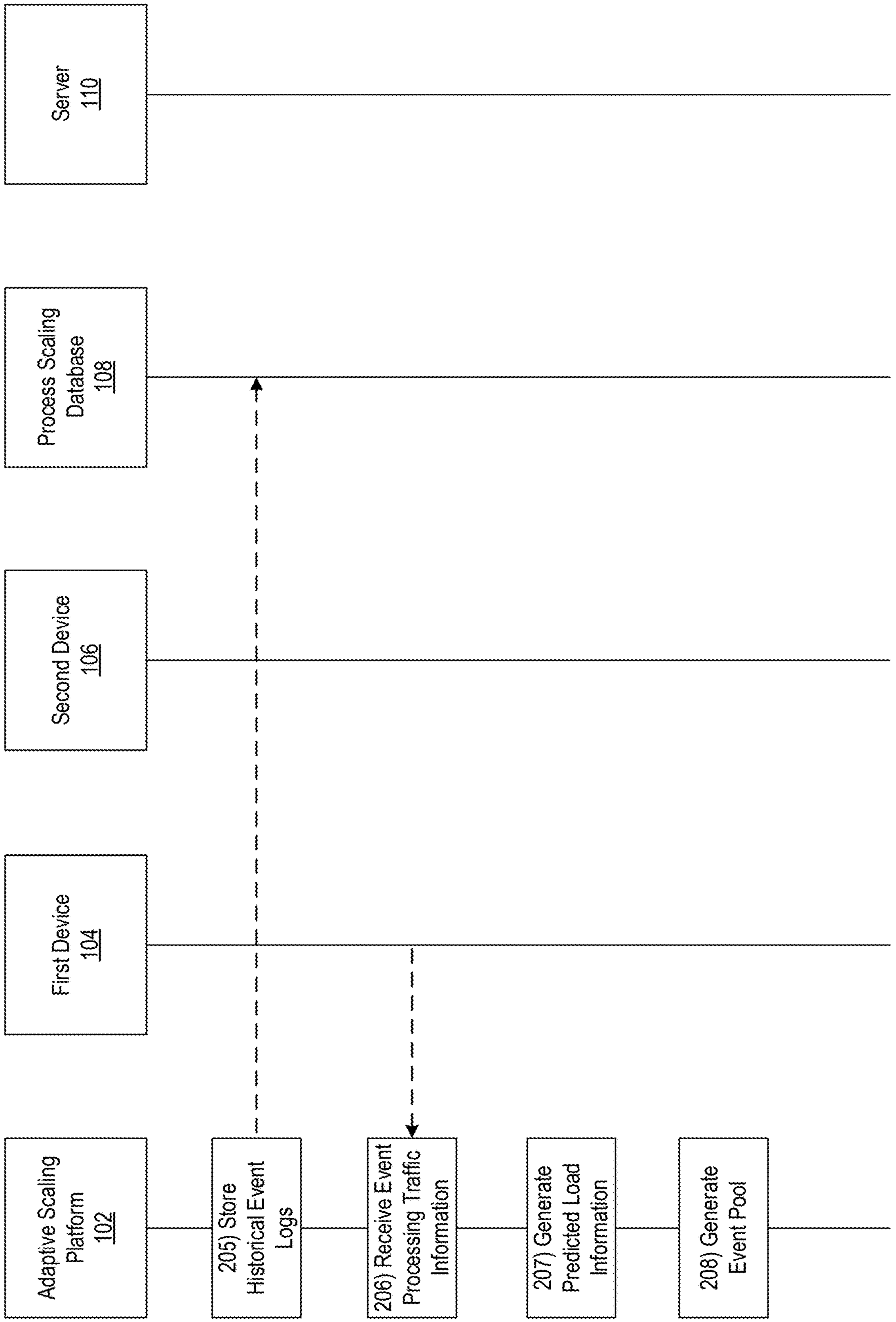

Referring to FIG. 2B, the adaptive scaling platform 102 may store historical event processing logs at the process scaling database 108. For example, the adaptive scaling platform 102 may store the historical event processing logs received at step 202 and/or used to train the delegation model. In storing the historical event processing logs at the process scaling database 108, the adaptive scaling platform 102 may cause the process scaling database 108 to update and/or generate a set of historical event processing logs that may, for example, be used to train and/or update the delegation model and/or other machine learning models in the future.

At step 206, the adaptive scaling platform 102 may receive event processing traffic information. For example, the adaptive scaling platform 102 may receive event processing traffic information such as, for example, a plurality of event processing requests (e.g., requests to deposit funds in an account, requests to withdraw funds from an account, requests to transfer funds, requests to access an account, and/or other event processing requests), indications of the source of event processing requests (e.g., applications, user devices, automated teller machines, or the like), indications of the resources used by a stream of event processing requests, and/or other event processing traffic information. The adaptive scaling platform 102 may receive the event processing traffic information from a user device, such as, for example, first device 104, and/or other devices. In these examples, the adaptive scaling platform 102 may receive the event processing traffic information via the communication interface 113 and/or while the first wireless data connection is established.

At step 207, the adaptive scaling platform 102 may generate predicted load information. For example, the adaptive scaling platform 102 may generate predicted load information based on inputting the event processing traffic information into the delegation model. In some examples, based on input of the event processing traffic information, the adaptive scaling platform 102 may cause the delegation model to generate or output predicted load information indicating a number of files to be processed to fulfill all event processing requests corresponding to the event processing traffic information, an amount of resources (e.g., memory, CPU usage, or the like) necessary to fulfill each event processing request corresponding to the event processing traffic information, a number of applications required to fulfill all event processing requests corresponding to the event processing traffic information, and/or other information predicting the requirements for fulfilling the event processing requests corresponding to the event processing traffic information.

In generating the predicted load information, the adaptive scaling platform 102 may cause the delegation model to use one or more stored correlations previously used to train the delegation model. In some examples, the adaptive scaling platform 102 may cause the delegation model to compare some or all of the event processing traffic information to the one or more stored correlations corresponding to historical event processing requests in order to generate predicted load information. In these examples, comparing the event processing traffic information to the one or more stored correlations corresponding to historical event processing requests may allow the delegation model to predict load information for event processing requests corresponding to the event processing traffic information based on similarities between the event processing requests and the historical event processing requests, indicated by the stored correlations. For example, based on identifying a first event processing request (e.g., a request to deposit funds in an account, request to withdraw funds from an account, request to transfer funds, request to access an account, and/or other event processing request) corresponding to the event processing traffic information (e.g., by analyzing the event processing traffic information to identify event processing requests), the adaptive scaling platform 102 may cause the delegation model to compare the first event processing request to one or more stored correlations to identify a similar historical event processing request. The adaptive scaling platform 102 may, based on identifying the similar historical event processing request, cause the delegation model to generate the predicted load information for the first event processing request based on historical load information corresponding to the similar historical event processing request. For example, based on identifying that the similar historical event processing request required processing of a particular number of files, the adaptive scaling platform 102 may cause the delegation model to generate predicted load information indicating that fulfilling the first event processing request will require processing of the same or substantially similar number of files.

In some examples, the adaptive scaling platform 102 may identify the similar historical event processing request based on a similarity score the delegation model generates based on the comparison between the first event processing request and each historical event processing request. In some examples, the delegation model may use one or more machine learning algorithms to generate the similarity score. For example, the adaptive scaling platform 102 may have previously trained the delegation model to employ a scoring algorithm to generate similarity scores based on stored correlations. For instance, the delegation model may execute the scoring algorithm using the following constraints/parameters to compare a first event processing request to a given historical event processing request:

$$\text{Similarity Score} = \frac{(\text{Number of Matched Traits})}{(\text{Number of Compared Traits})} * 100$$

In this example, the delegation model may compare particular traits of a first event processing request corresponding to the event processing traffic information against traits of a given historical event processing request, based on stored correlations indicating the traits of the historical event processing request. The compared traits may comprise a source of the event processing request, a type of event processing request, a destination of the event processing request, an application corresponding to the event processing request, and/or other traits. The delegation model may, based on comparing the traits, simultaneously or near-simultaneously execute the example scoring algorithm to generate a similarity score comprising the quotient of the number of traits that match between the first event processing request and the historical event processing request and the total number of compared traits, multiplied by one hundred. It should be understood that this is merely one illustrative example of a scoring algorithm that may be executed by the delegation model and that additional and/or alternative algorithms may be used without departing from the scope of this disclosure.

At step 208, the adaptive scaling platform 102 may generate an event pool. The event pool may represent one or more requirements for fulfilling event processing requests. For example, the event pool may comprise a plurality of tasks required to fulfill one or more event processing requests corresponding to the event processing traffic information, a plurality of indicators of applications corresponding to the plurality of tasks, and/or other information indicating events, actions, or the like associated with fulfillment of the event processing requests corresponding to the event processing traffic information. In some examples, in generating the event pool, the adaptive scaling platform 102 may input the event processing traffic information into the delegation model. In these examples, the delegation model may, based on the event processing traffic information, identify event processing requests corresponding to and/or included in the event processing traffic information. For example, the delegation model may parse, read, and/or otherwise analyze the event processing traffic information to identify the event processing requests. The delegation model may, based on identifying the event processing requests, generate the event pool by identifying tasks required to fulfill each event processing request and/or by identifying applications that might be used to complete the tasks for each event processing request. For example, the delegation model may use one or more stored correlations between historical event processing requests to identify which tasks and/or applications correspond to event processing requests corresponding to and/or included in the event processing traffic information by, for example, analyzing the event processing requests for indicators of tasks and/or applications similar to indicators identified by the stored correlations.

Additionally and/or alternatively, in some examples, the adaptive scaling platform 102 may cause the delegation model to generate the event pool by and/or based on inputting the predicted load information into the delegation model. The delegation model may, for example, use the predicted load information to identify the plurality of indicators of applications for inclusion in the event pool. For example, in some instances, one application may be better suited, relative to other applications, to fulfilling a particular event processing request if predicted load information for the event processing request indicates a predicted load exceeds a threshold value. Accordingly, in generating the event pool, the adaptive scaling platform 102 may cause the delegation model to, based on the predicted load information, generate an event pool comprising indicators of optimal applications for fulfilling event processing requests corresponding to and/or included in the event processing traffic information.

In some examples, in generating the event pool, the adaptive scaling platform 102 may generate a cell-based architecture comprising a plurality of cells. Each cell of the plurality of cells may correspond to a particular event processing request included in the event processing traffic information. Each cell of the plurality of cells may comprise one or more tasks and one or more indicators of applications corresponding to the corresponding event processing request.

Figure 2C:
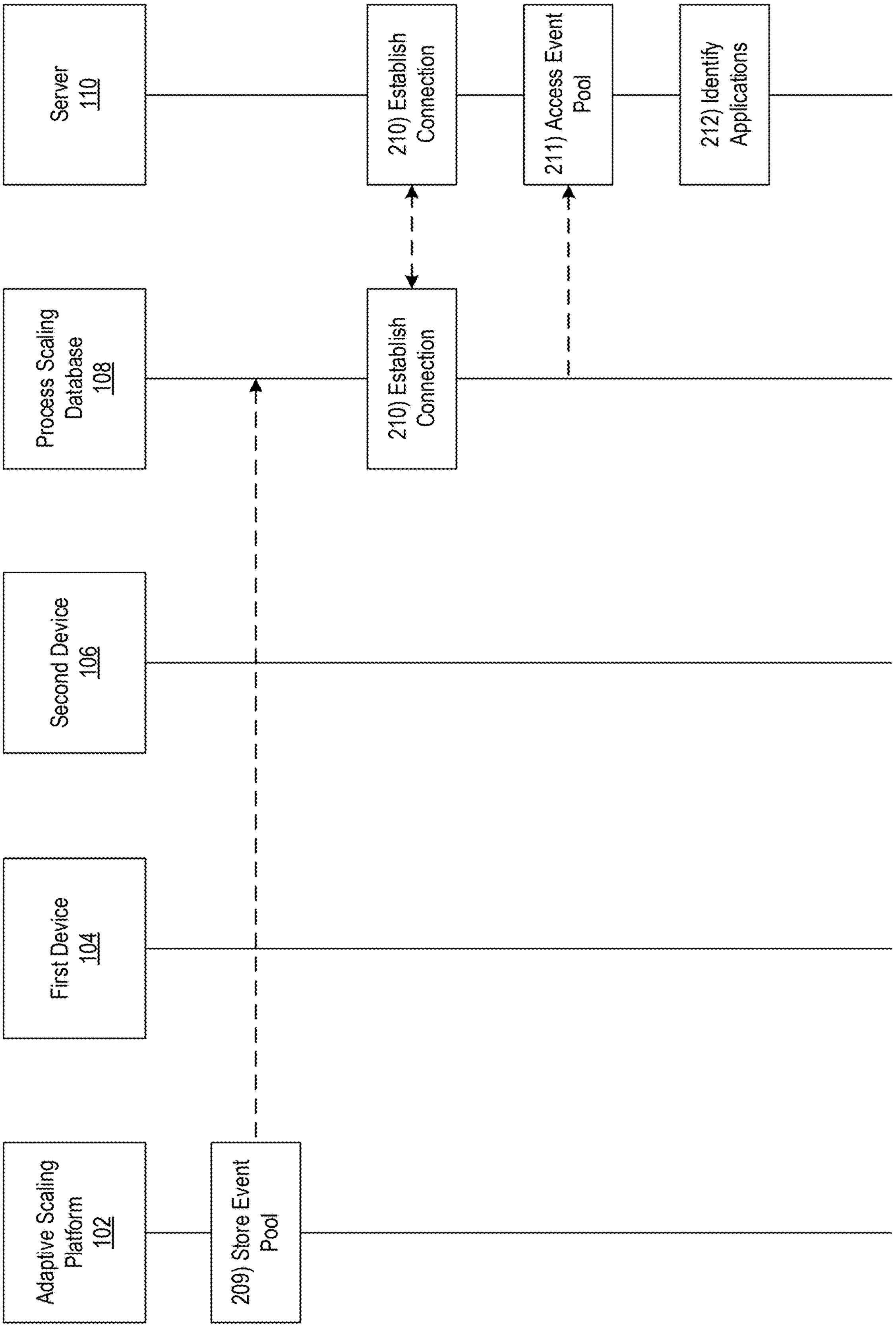

Referring to FIG. 2C, at step 209, the adaptive scaling platform 102 may store the event pool to the process scaling database 108. In some examples, the adaptive scaling platform 102 may store the event pool by uploading and/or otherwise providing all of the information comprising the event pool to the process scaling database 108. In some instances, the adaptive scaling platform 102 may store the event pool by causing the process scaling database 108 to generate a cell architecture comprising the event pool.

At step 210, the server 110 may establish a connection with the process scaling database 108. For example, the adaptive scaling platform 102 may establish the connection with the process scaling database 108 to access event pools as part of a service provided by the adaptive scaling platform 102 and/or by the enterprise organization corresponding to the adaptive scaling platform 102. For example, the server 110 may correspond to the same enterprise organization as the adaptive scaling platform 102 and may, in some examples, be configured to provide applications (e.g., from an application pool, or the like) to the adaptive scaling platform 102 as part of methods of reducing application carbon footprints as described herein. In establishing the connection with the process scaling database 108, the server 110 may establish a third wireless data connection with the process scaling database 108 to link the process scaling database 108 with the server 110 (e.g., in preparation for accessing event pools, and/or other functions). In some instances, the server 110 may identify whether or not a connection is already established with the process scaling database 108. If a connection is already established with the process scaling database 108, the server 110 might not re-establish the connection. If a connection is not yet established with the process scaling database 108, the server 110 may establish the third wireless data connection as described above.

At step 211, the server 110 may access an event pool. In some examples, the server 110 may access an event pool previously stored at the process scaling database 108 by the adaptive scaling platform 102. In some examples, in accessing the event pool, the server 110 may send a query, request, and/or other message to the process scaling database 108 in order to identify and access the most recently-stored event pool. Accessing the event pool may comprise accessing all of in the information comprising the event pool.

At step 212, based on accessing the event pool, the server 110 may identify one or more applications. For example, the server 110 may identify one or more applications for fulfilling event processing requests based on analyzing the information of the event pool. In some examples, in analyzing the information of the event pool, the server 110 may identify optimal applications (e.g., based on the plurality of indicators of applications of the event pool) for fulfilling the event processing requests corresponding to and/or included in the event processing traffic information received by the adaptive scaling platform 102. In some examples, in identifying the one or more applications, the server 110 may compare features, specifications, and/or other traits of applications in a pool of applications managed by an enterprise organization to requirements for fulfilling the plurality of tasks of the event pool.

Figure 2D:
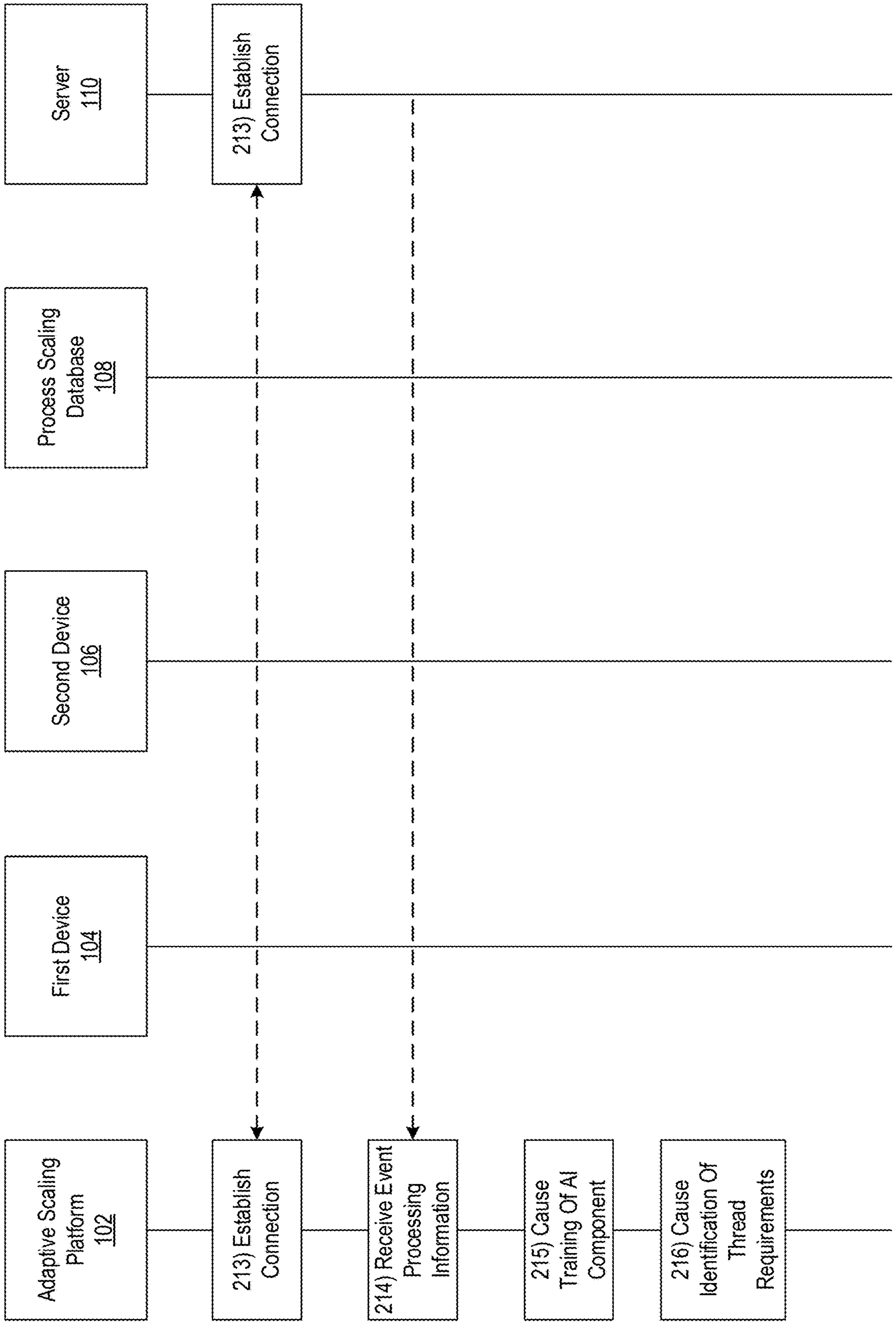

Referring to FIG. 2D, at step 213, the adaptive scaling platform 102 may establish a connection with the server 110. For example, the adaptive scaling platform 102 may establish a fourth wireless data connection with the server 110 to link the server 110 with the adaptive scaling platform 102 (e.g., in preparation for receiving event processing information and/or requests, receiving event pool information, receiving indications of applications corresponding to event processing requests, and/or other functions). In some instances, the adaptive scaling platform 102 may identify whether or not a connection is already established with the server 110. If a connection is already established with the server 110, the adaptive scaling platform 102 might not re-establish the connection. If a connection is not yet established with the server 110, the adaptive scaling platform 102 may establish the fourth wireless data connection as described herein.

At step 214, the adaptive scaling platform 102 may receive event processing information from the server 110. For example, the adaptive scaling platform 102 may receive the event processing information via the communication interface 113 and while the fourth wireless data connection is established. In some examples, the adaptive scaling platform 102 may receive the event processing information based on a service agreement between the adaptive scaling platform 102 and the server 110. For example, the server 110 may correspond to an adaptive scaling service for reducing application carbon footprints and the adaptive scaling platform 102 may be configured to coordinate with the server 110 as part of the service.

The event processing information may comprise a variety of information required to fulfill an event processing request while reducing application carbon footprints using methods described herein. In some examples, the event processing information may comprise one or more of: an event processing request, an indication of an application corresponding to the event processing request, event pool information corresponding to the event processing request, and/or other information. The event processing request may, for example, comprise an event processing request corresponding to and/or included in the event processing traffic information previously received by the adaptive scaling platform 102. The indication of the application corresponding to the event processing request may direct the adaptive scaling platform 102 to a file, storage location, application pool, and/or other location where the adaptive scaling platform 102 may access an application configured to perform one or more tasks required to fulfill the event processing request. The event pool information corresponding to the event processing request may comprise information from the event pool generated by the adaptive scaling platform 102 (e.g., as described herein at step 208). For example, the event pool information may comprise a one or more tasks required to fulfill the event processing request, predicted load information corresponding to the event processing request, and/or other event pool information.

At step 215, based on receiving the event processing information, the adaptive scaling platform 102 may cause configuring and/or training of an artificial intelligence (AI) component of an application. For example, the adaptive scaling platform 102 may cause training of an AI component of an application indicated by the event processing information and configured to fulfill the event processing request. In some examples, in causing training of the AI component of the application, the adaptive scaling platform 102 may embed the AI component in the application. For example, the adaptive scaling platform 102 may embed an AI listener component comprising a program, model, and/or other software component configured to analyze thread (e.g., sequences of programmed instructions, or the like) requirements, delegate tasks, monitor threads, and/or perform other functions into the application. In some examples, an AI component may already be embedded in the application. In these examples, the adaptive scaling platform 102 may proceed to cause training of the AI component without embedding the AI component again.

In causing configuring and/or training of the AI component, the adaptive scaling platform 102 may input historical event processing information into the AI component. For example, the adaptive scaling platform 102 may input the historical event processing previously received by the adaptive scaling platform 102 and/or historical event processing information stored at the process scaling database 108 into the AI component to cause the application to train the AI component to output thread requirements based on input of event processing information. For example, the adaptive scaling platform 102 may cause the application to train the AI component to output thread requirements based on identifying similarities between event processing requests and the thread requirements of historical event processing requests requiring fulfillment of the same and/or similar tasks. The thread requirements may comprise information of resources, such as memory, CPU usage, or the like, required by a thread to complete the one or more tasks the thread is configured to fulfill. In some instances, to configure and/or otherwise train the AI component, the adaptive scaling platform 102 may cause the AI component to process the historical event processing information by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

At step 216, based on causing training of the AI component, the adaptive scaling platform 102 may cause identification of one or more thread requirements. For example, the adaptive scaling platform 102 may cause identification of one or more requirements for a sequence of programmed instructions (e.g., a thread) or the like to fulfill one or more tasks. In causing identification of the one or more thread requirements, the adaptive scaling platform 102 may input the event pool information (e.g., as described at step 214 herein) into the application comprising the AI component and/or otherwise cause the application to access the event pool information. In some examples, based on inputting the event pool information, the adaptive scaling platform 102 may cause the AI component to identify the one or more thread requirements by identifying the tasks included in the event pool information and required for fulfillment of the event processing request. Based on identifying the tasks, the AI component may identify, using one or more stored correlations corresponding to the historical event processing information used to train the AI component, requirements (e.g., memory allocation requirements, CPU usage requirements, timing requirements, and/or other requirements) for completing each task. For example, the AI component may identify, based on the stored correlations and for a given task, a same or similar historical task corresponding to the historical event processing information. Accordingly, the AI component may identify that the given task has the same requirements as the historical task. The AI component may generate one or more threads, each thread corresponding to one or more tasks and with thread requirements corresponding to the identified requirements of the one or more tasks.

Figure 2E:
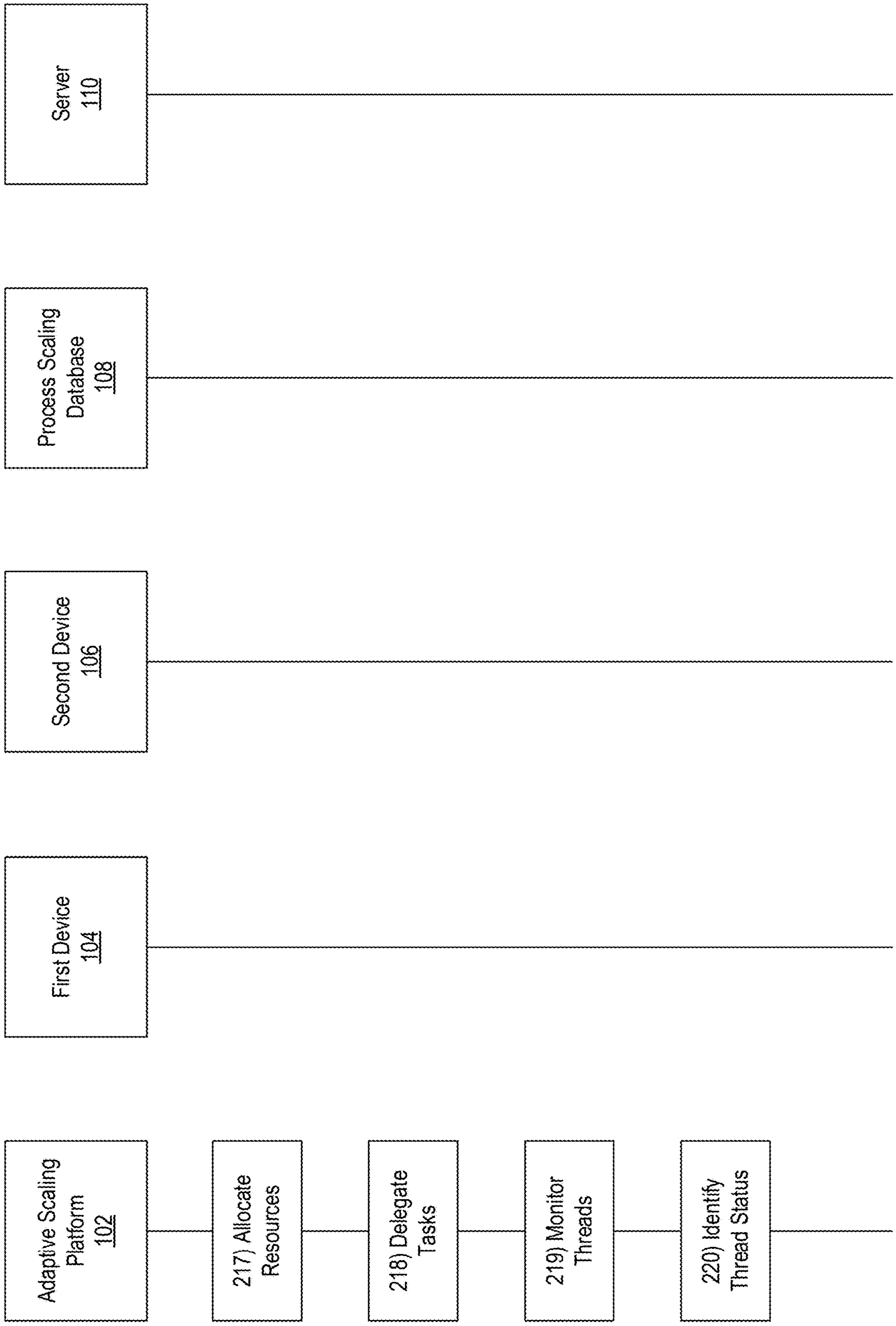

Referring to FIG. 2E, at step 217, the adaptive scaling platform 102 may allocate resources to one or more threads. In allocating the resources, the adaptive scaling platform 102 may cause the application to allocate resources to one or more threads based on the one or more thread requirements identified at step 216. For example, based on a thread requirement indicating the thread requires a particular amount of memory to complete its corresponding tasks, the adaptive scaling platform 102 may cause the application to allocate the particular amount of memory to the thread. Because the thread requirements identified by the AI component of the application are based on event pool information, generated by the delegation model trained on historical event processing information as described herein, the adaptive scaling platform 102 allocates the optimal amount of memory to the thread. Accordingly, the carbon footprint of the application is reduced because excess resources (e.g., memory, or the like) requiring energy are not allocated to the threads. As a result, waste is avoided.

At step 218, the adaptive scaling platform 102 may delegate tasks to the one or more threads. In some examples, the adaptive scaling platform 102 may cause the application to delegate the tasks to threads based on the allocated resources. For example, the adaptive scaling platform 102 may cause the application to delegate tasks (e.g., tasks included in the event pool information) identified by the AI component (e.g., as described at step 216) to the appropriate threads such that the tasks delegated to a particular thread require exactly or near-exactly the amount of resources allocated to the particular thread. The adaptive scaling platform 102 may delegate tasks until each task required for fulfillment of the event processing request is allocated to an appropriate thread.

At step 219, based on delegating the tasks, the adaptive scaling platform 102 may monitor the one or more threads. In some examples, the adaptive scaling platform 102 may monitor the one or more threads by actively scanning and/or otherwise monitoring the progress completing tasks, the resource consumption, the allocated resources, and/or other parameters of the threads. Additionally and/or alternatively, in some examples, the adaptive scaling platform 102 may monitor the one or more threads by causing the AI component of the application to monitor the one or more threads. For example, the adaptive scaling platform 102 may cause the AI component to continuously or near-continuously receive information (e.g., the progress completing tasks, the resource consumption, the allocated resources, and/or other parameters of the threads) as the threads are executed by the application to fulfill the event processing request.

At step 220, based on and/or while monitoring the one or more threads, the adaptive scaling platform 102 may identify a status of at least one thread. In some examples, the status of the at least one thread may comprise information of the thread's impact on the application's carbon footprint. For example, the status of the at least one thread may comprise information indicating whether the at least one thread is active (e.g., whether the at least one thread is actively completing one or more tasks, and/or otherwise active), information indicating whether the at least one thread comprises unused resources (e.g., based on a comparison of the allocated resources and the resources in use by the at least one thread), and/or other information.

In some examples, identifying the status of the at least one thread may comprise identifying whether the at least one thread corresponds to any pending tasks. For example, the adaptive scaling platform 102 may identify whether any tasks corresponding to the thread and required for fulfilling the event processing request remain pending. Additionally and/or alternatively, in some examples, identifying the status of the at least one thread may comprise identifying a percentage of the allocated memory of the at least one thread that is being used to perform a task. For example, the adaptive scaling platform 102 may identify whether the task actively being performed by the at least one thread is utilizing the full amount of memory allocated to the at least one thread, or a lesser percentage of the memory allocated to the at least one thread.

Figure 2F:
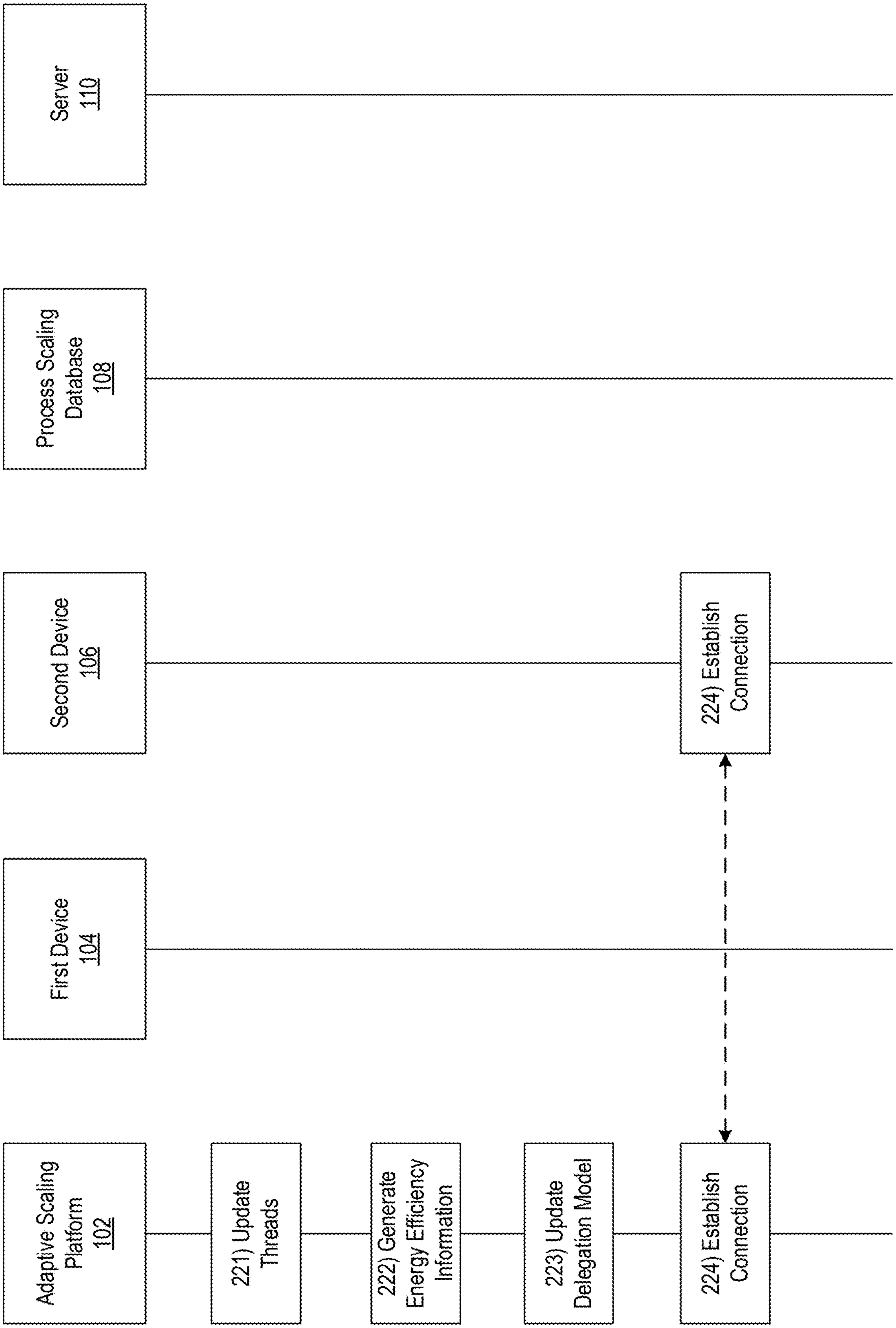

Referring to FIG. 2F, at step 221, the adaptive scaling platform 102 may update one or more threads. For example, the adaptive scaling platform 102 may update the one or more threads to implement adaptive scaling in order to reduce the carbon footprint of the application. In updating the one or more threads, the adaptive scaling platform 102 may use the status of threads identified by the adaptive scaling platform 102 (e.g., as described at step 220 herein). For example, based on a status of at least one thread indicating that the at least one thread is active and comprises unused resources, the adaptive scaling platform 102 may resize the thread. Resizing the thread may comprise modifying an amount of memory allocated to the at least one thread by scaling back (e.g., reducing) the amount of memory allocated to the at least one thread. Resizing the thread may additionally and/or alternatively comprise other methods of reducing the resources allocated to the at least one thread. Accordingly, the adaptive scaling platform 102 may reduce the energy consumption of the thread and, consequently, the application by ensuring the minimum amount of resources required by the thread are allocated to the thread. Additionally and/or alternatively, the adaptive scaling platform 102 may update one or more threads based on a status of at least one thread indicating that the thread is inactive. For example, the adaptive scaling platform 102 may dispose of and/or otherwise reallocate resources corresponding to the at least one thread. It should be understood that the methods of updating the one or more threads and/or otherwise implementing adaptive scaling as described herein are merely examples, and that other methods may be used without departing from the scope of this disclosure.

At step 222, the adaptive scaling platform 102 may, based on monitoring the one or more threads, generate energy efficiency information for the delegation model. In some examples, the adaptive scaling platform 102 may generate the energy efficiency information during the monitoring. In some examples, the adaptive scaling platform 102 may generate the energy efficiency information after the monitoring and/or after all threads are closed and the event processing request is fulfilled. In generating the energy efficiency information for the delegation model, the adaptive scaling platform 102 may analyze information corresponding to the performance of the application in fulfilling the event processing request and/or otherwise identify statistics indicating a degree to which the carbon footprint of the application was reduced using the methods described herein. For example, the adaptive scaling platform 102 may identify, over a period of time, a number of threads and/or an amount of resources corresponding to threads allocated to fulfill the event processing request, a number of threads and/or an amount of resources corresponding to threads utilized over the period of time, and/or other information indicating an efficiency of allocated threads and/or resources as compared to utilized threads and/or resources. Additionally and/or alternatively, in some examples, in generating the energy efficiency information for the delegation model, the adaptive scaling platform 102 may access and/or generate information indicating efficiency of allocated threads and/or resources as compared to utilized threads and/or resources for conventional methods of reducing application carbon footprints. In these examples, the adaptive scaling platform 102 may generate energy efficiency information indicating a degree of improvement the methods described herein display over conventional methods of reducing application carbon footprints.

At step 223, the adaptive scaling platform 102 may refine, validate, and/or otherwise update the delegation model. For example, the adaptive scaling platform 102 may update the delegation model based on the monitoring of the one or more threads and/or based on the identifying the status of the one or more threads. For example, the adaptive scaling platform 102 may input information obtained by the monitoring and/or the identifying into the delegation model as an additional training set and/or to refine the delegation model. By inputting the information (e.g., information indicating whether any threads comprised unused resources, information indicating whether any threads require resizing, and/or other information) into the delegation model, the adaptive scaling platform 102 may create an iterative feedback loop that may continuously and dynamically refine the delegation model to improve its accuracy. By inputting the information into the delegation model, the adaptive scaling platform 102 may cause the delegation model to update one or more stored correlations based on the information. For example, the adaptive scaling platform 102 may cause the delegation model to store new correlations and/or update existing correlations such that the delegation model may generate event pool information indicating different applications for future event processing requests, with the same or similar parameters, in future iterations of the feedback loop. In some examples, the different applications may be more efficient in performing tasks such that the threads used by the application do not comprise unused resources.

Additionally and/or alternatively, in some examples, the adaptive scaling platform 102 may update the delegation model based on energy efficiency information generated by the adaptive scaling platform 102 (e.g., as described at step 222 herein). For example, the adaptive scaling platform 102 may input the energy efficiency information into the delegation model as an additional training set and/or to refine the delegation model. By inputting the energy efficiency information into the delegation model, the adaptive scaling platform 102 may create an iterative feedback loop and/or improve an existing iterative feedback loop to refine the delegation model and improve its accuracy. By inputting the energy efficiency information into the delegation model, the adaptive scaling platform 102 may cause the delegation model to generate event pool information that, if inputted into an AI component of an application, causes the AI component to refine its parameters for identifying thread requirements for event processing requests, with the same or similar parameters, in future iterations of the feedback loop.

In updating the delegation model, the adaptive scaling platform 102 may improve the accuracy of the model for generating event pools, which may, e.g., result in more efficient training of machine learning models trained by the adaptive scaling platform 102 (and may in some instances, conserve computing and/or processing power/resources in doing so). The adaptive scaling platform 102 may further reduce the carbon footprint of applications by improving the efficiency of the delegation model in generating event pools and/or event pool information used to allocate resources and delegate tasks to applications.

At step 224, the adaptive scaling platform 102 may establish a connection with the second device 106. For example, the adaptive scaling platform 102 may establish a fifth wireless data connection with the second device 106 to link the second device 106 with the adaptive scaling platform 102 (e.g., in preparation for causing display of a user interface, and/or other functions). In some instances, the adaptive scaling platform 102 may identify whether or not a connection is already established with the second device 106. If a connection is already established with the second device 106, the adaptive scaling platform 102 might not re-establish the connection. If a connection is not yet established with the second device 106, the adaptive scaling platform 102 may establish the fifth wireless data connection as described herein.

Figure 2G:
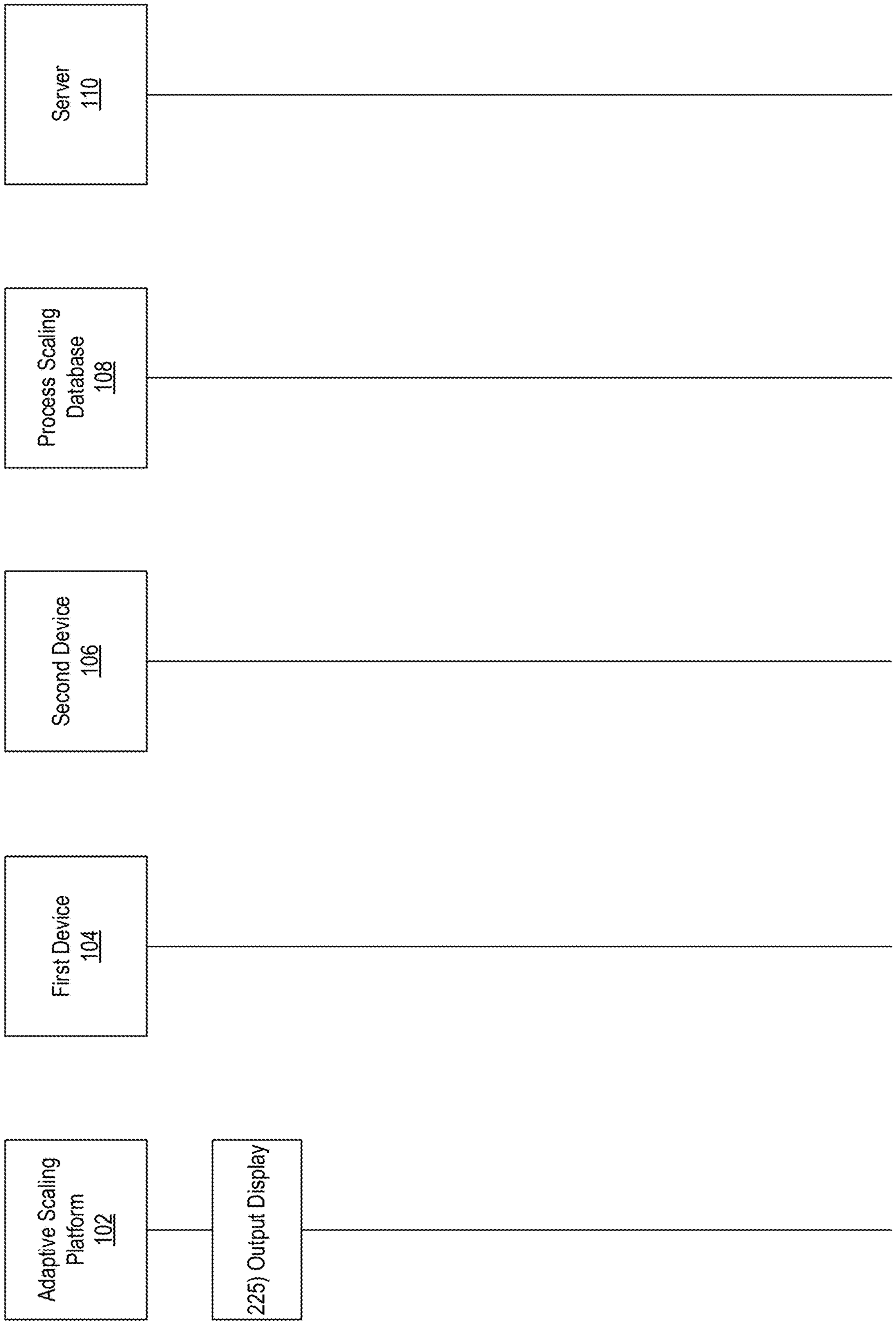
Figure 3:
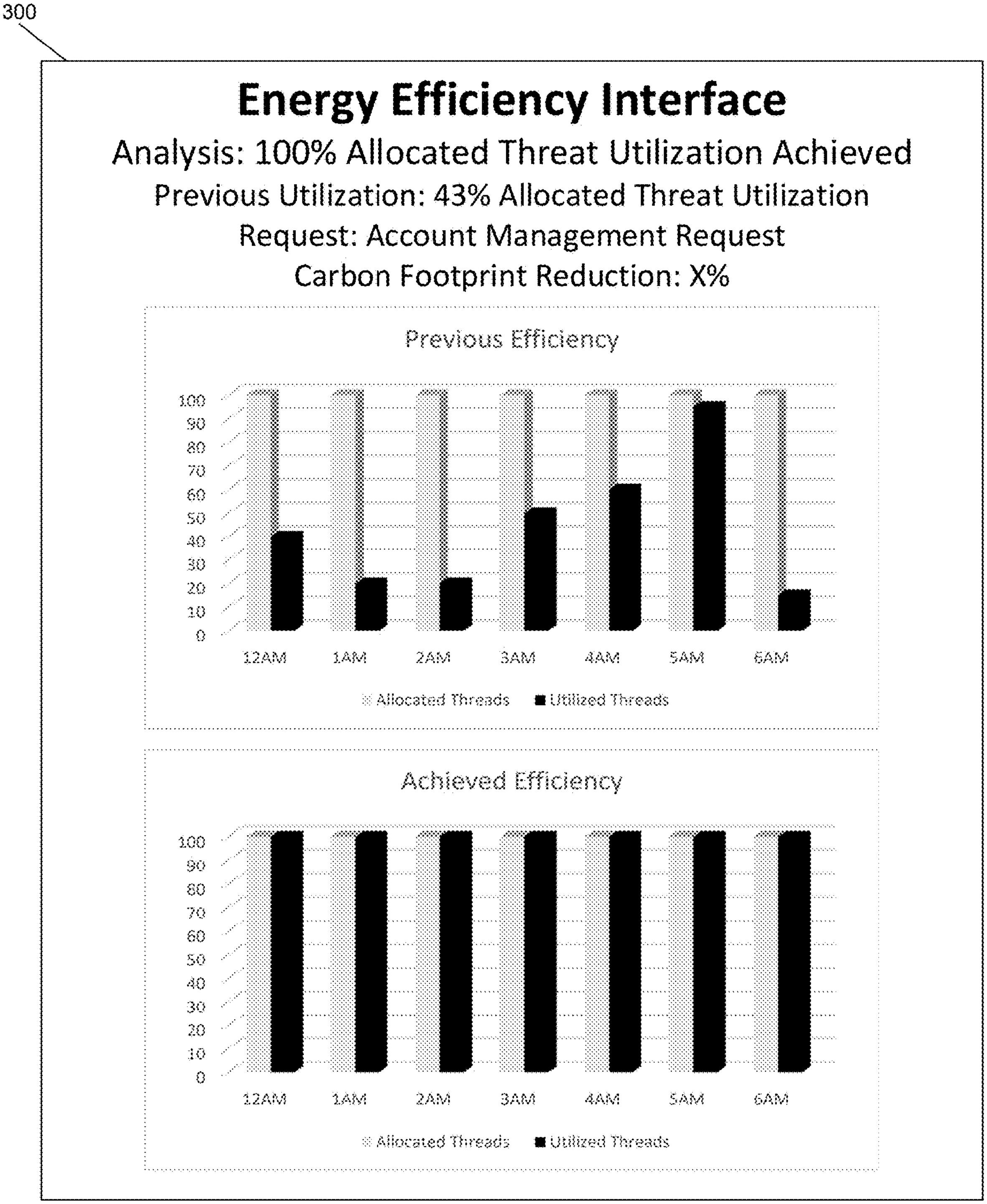
FIG. 3 depicts an illustrative graphical user interface generated as part of reducing application carbon footprints using predictive load balancing and adaptive process scaling in accordance with one or more example arrangements.

Referring to FIG. 2G, at step 225, the adaptive scaling platform 102 may cause output and/or otherwise display a user interface. In some examples, in causing output of the user interface, the adaptive scaling platform 102 may transmit and cause display of an energy efficiency interface for notifying a user (e.g., an administrator of the enterprise organization associated with the adaptive scaling platform 102, and/or other users) of energy savings and/or efficiency resulting from techniques for reducing application carbon footprints described herein. In displaying the energy efficiency interface, the adaptive scaling platform 102 may cause display of a graphical user interface similar to energy efficiency interface 300, which is illustrated in FIG. 3. For example, the adaptive scaling platform 102 may output one or more instructions (via the communication interface 113 and while the fifth wireless data connection is established) to the second device 106, causing the second device 106 to display the energy efficiency interface 300.

Referring to FIG. 3, in some instances, the energy efficiency interface 300 may include information corresponding to the energy savings and/or efficiency of applications and/or threads used to fulfill an event processing request, as described herein. For example, the energy efficiency interface 300 may include information such as an analysis of the energy savings and/or efficiency achieved using methods described herein, an indication of the previous efficiency (e.g., of conventional methods of reducing application carbon footprints), an indication of the event processing request fulfilled using methods of reducing application carbon footprints described herein, and/or other information. The energy efficiency interface 300 may also display graphical elements and/or graphics. For example, the energy efficiency interface 300 may display one or more of: a table, chart, graph, and/or other graphical representation of energy efficiency achieved using methods of reducing application carbon footprints described herein.

Figure 4A:
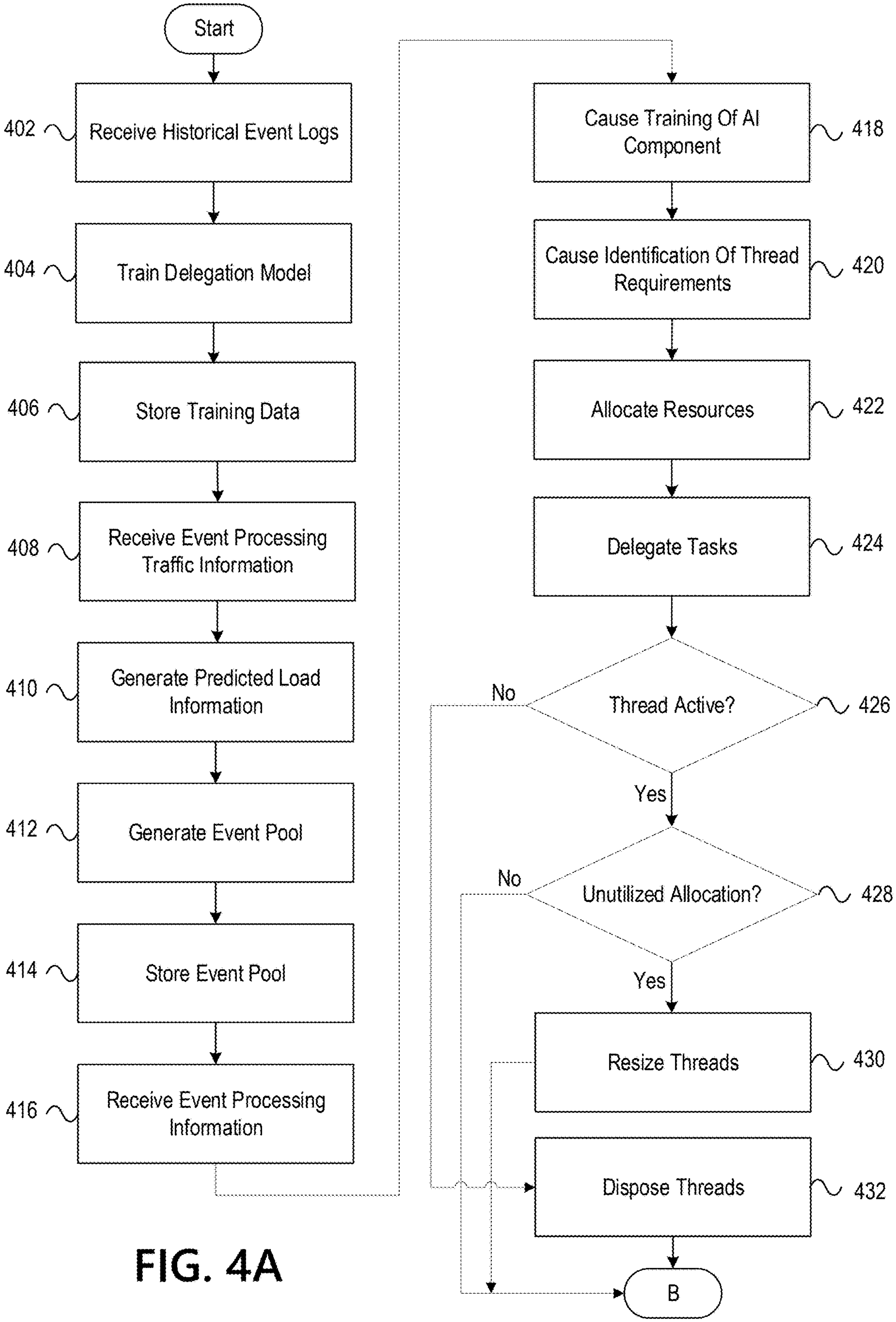
FIGS. 4A-4B depict an illustrative method for reducing application carbon footprints using predictive load balancing and adaptive process scaling in accordance with one or more example arrangements.
Figure 4B:
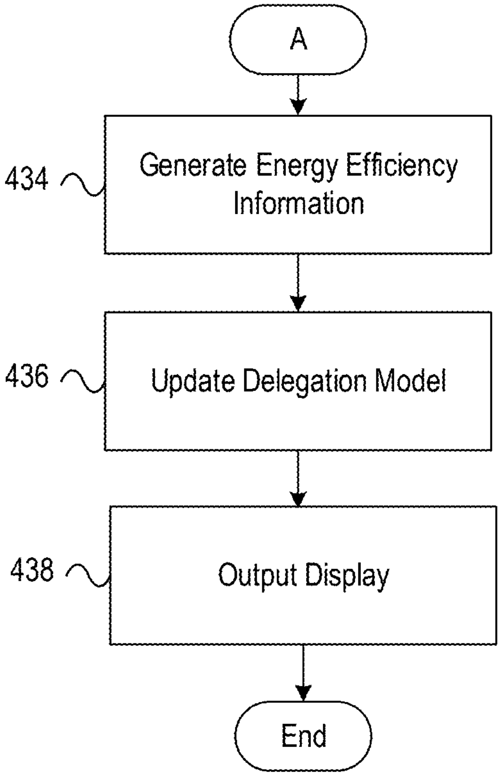

FIGS. 4A-4B depict an illustrative method for reducing application carbon footprints using predictive load balancing and adaptive process scaling in accordance with one or more example arrangements. Referring to FIG. 4A, at step 402, a computing platform having at least one processor, a communication interface, and memory may receive historical event logs (e.g., historical event processing logs comprising historical event processing information, or the like). At step 404, the computing platform may train a delegation model. For example, the computing platform may train a delegation model to output event pools based on input of event processing traffic information. At step 406, the computing platform may store training data. For example, the computing platform may store historical event processing information to a process scaling database (e.g., for use in training additional models, and/or for other functions). At step 408, the computing platform may receive event processing traffic information. At step 410, the computing platform may generate predicted load information. For example, the computing platform may generate predicted load information for event processing requests corresponding to and/or included in the event processing traffic information based on inputting the event processing traffic information into the delegation model. At step 412, the computing platform may generate an event pool. For example, the computing platform may generate an event pool comprising a plurality of tasks required to fulfill one or more event processing requests corresponding to the event processing traffic information, a plurality of indicators of applications corresponding to the plurality of tasks, and/or other event pool information based on inputting the event processing traffic information into the delegation model.

At step 414, the computing platform may store the event pool. For example, the computing platform may store the event pool to a process scaling database. At step 416, the computing platform may receive event processing information. For example, the computing platform may receive event processing information comprising an event processing request, event pool information corresponding to the event processing request, an indication of an application corresponding to the event processing request, and/or other information. At step 418, the computing platform may cause training of an AI component. For example, the computing platform may cause training of an AI component, embedded in an application, configured to output thread requirements based on input of event pool information. At step 420, the computing platform may cause identification of thread requirements. For example, the computing platform may cause an AI component of an application to identify thread requirements for fulfilling an event processing request. At step 422, the computing platform may allocate resources to threads. At step 424, the computing platform may delegate tasks to the threads. At step 426, the computing platform may identify (e.g., based on monitoring one or more threads) whether a thread is active. Based on identifying that the thread is not active, the computing platform may proceed to step 432. Based on identifying that the thread is active, the computing platform may proceed to step 428.

At step 428, based on identifying that the thread is active, the computing platform may identify whether the thread has any unutilized allocation. For example, the computing platform may identify whether any resources allocated to the thread are unused. Based on identifying that the thread has no unused allocation, the computing platform may proceed to step 434, as shown in FIG. 4B. Based on identifying that the thread has at least some unused allocation, the computing platform may proceed to step 430. At step 430, based on identifying that the thread has at least some unused allocation, the computing platform may resize one or more threads. Based on resizing the one or more threads, the computing platform may proceed to step 434, as shown in FIG. 4B, and may not perform the functions of step 432. At step 432, based on identifying that the thread is not active, the computing platform may dispose of one or more threads. Referring to FIG. 4B, at step 434, the computing platform may generate energy efficiency information. For example, the computing platform may generate energy efficiency information corresponding to energy savings provided by the delegation model. At step 436, the computing platform may update the delegation model. For example, the computing platform may update the delegation model based on monitoring of one or more threads, based on the energy efficiency information, and/or based on other information.

At step 438, the computing platform may output a display (e.g., a user interface, or the like).

One or more aspects of the disclosure may be embodied in computer-usable data or computer-executable instructions, such as in one or more program modules, executed by one or more computers or other platforms to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, configure the computing platform to:

train, based on historical event processing information, a delegation model, wherein the training the delegation model configures the delegation model to output event pools based on input of event processing traffic information;

receive, from a user device, event processing traffic information;

generate, based on inputting the event processing traffic information into the delegation model, an event pool, wherein the event pool comprises:

a plurality of tasks required to fulfill one or more event processing requests corresponding to the event processing traffic information; and a plurality of indicators of applications corresponding to the plurality of tasks;

receive, from a server, an event processing request, an indication of an application corresponding to the event processing request, and event pool information corresponding to the event processing request;

cause, based on inputting the event pool information into the application, the application to identify one or more thread requirements;

allocate, based on the one or more thread requirements, resources to one or more threads;

delegate, based on the allocating, at least one task of the plurality of tasks; and update, based on monitoring the one or more threads, the delegation model.

2. The computing platform of claim 1, wherein generating the event pool comprises:

generating, using the delegation model and based on the event processing traffic information, predicted load information; and identifying, based on the predicted load information, a plurality of applications for fulfilling the one or more event processing requests.

3. The computing platform of claim 1, wherein the memory stores additional computer-readable instructions that, when executed by the at least one processor, further configure the computing platform to:

embed, in the application corresponding to the event processing request, an artificial intelligence listener component; and cause, based on the historical event processing information, the application to train the artificial intelligence listener component to output thread requirements based on input of event pool information, wherein causing the application to identify the one or more thread requirements comprises inputting the event pool information into the artificial intelligence listener component.

4. The computing platform of claim 1, wherein the memory stores additional computer-readable instructions that, when executed by the at least one processor, further configure the computing platform to:

identify, based on the monitoring the one or more threads, a status for at least one thread of the one or more threads, wherein the status indicates whether the at least one thread is active and whether the at least one thread comprises unused resources; and based on identifying that the at least one thread is active and comprises unused resources, resize the at least one thread, or based on identifying that the at least one thread is inactive, dispose of one or more resources corresponding to the at least one thread.

5. The computing platform of claim 4, wherein resizing the at least one thread comprises modifying an amount of memory allocated to the at least one thread.

6. The computing platform of claim 4, wherein identifying the status for the at least one thread comprises:

identifying whether the at least one thread corresponds to any pending tasks; and identifying a percentage of allocated memory of the at least one thread that is being used to perform a task.

7. The computing platform of claim 1, wherein the server corresponds to an adaptive process scaling service.

8. The computing platform of claim 1, wherein the memory stores additional computer-readable instructions that, when executed by the at least one processor, further configure the computing platform to:

generate, based on monitoring the one or more threads, energy efficiency information corresponding to the delegation model, wherein updating the delegation model comprises updating the delegation model based on the energy efficiency information.

9. The computing platform of claim 1, wherein the memory stores additional computer-readable instructions that, when executed by the at least one processor, further configure the computing platform to:

output, to a second user device, an energy efficiency interface, wherein the energy efficiency interface comprises energy efficiency information corresponding to the delegation model.

10. The computing platform of claim 1, wherein the memory stores additional computer-readable instructions that, when executed by the at least one processor, further configure the computing platform to:

store the event pool to a process scaling database, wherein the process scaling database is a component of a different computing platform.

11. The computing platform of claim 1, wherein the one or more thread requirements comprise memory allocation information corresponding to the at least one task.

12. A method comprising:

at a computing device comprising least one processor, a communication interface, and memory:

training, based on historical event processing information, a delegation model, wherein the training the delegation model configures the delegation model to output event pools based on input of event processing traffic information;

receiving, from a user device, event processing traffic information;

generating, based on inputting the event processing traffic information into the delegation model, an event pool, wherein the event pool comprises:

a plurality of tasks required to fulfill one or more event processing requests corresponding to the event processing traffic information; and a plurality of indicators of applications corresponding to the plurality of tasks;

receiving, from a server, an event processing request, an indication of an application corresponding to the event processing request, and event pool information corresponding to the event processing request;

causing, based on inputting the event pool information into the application, the application to identify one or more thread requirements;

allocating, based on the one or more thread requirements, resources to one or more threads;

delegating, based on the allocating, at least one task of the plurality of tasks; and updating, based on monitoring the one or more threads, the delegation model.

13. The method of claim 12, wherein generating the event pool comprises:

generating, using the delegation model and based on the event processing traffic information, predicted load information; and identifying, based on the predicted load information, a plurality of applications for fulfilling the one or more event processing requests.

14. The method of claim 12, further comprising:

embedding, in the application corresponding to the event processing request, an artificial intelligence listener component; and causing, based on the historical event processing information, the application to train the artificial intelligence listener component to output thread requirements based on input of event pool information, wherein causing the application to identify the one or more thread requirements comprises inputting the event pool information into the artificial intelligence listener component.

15. The method of claim 12, further comprising:

identifying, based on the monitoring the one or more threads, a status for at least one thread of the one or more threads, wherein the status indicates whether the at least one thread is active and whether the at least one thread comprises unused resources; and based on identifying that the at least one thread is active and comprises unused resources, resizing the at least one thread, or based on identifying that the at least one thread is inactive, disposing of one or more resources corresponding to the at least one thread.

16. The method of claim 12, further comprising:

generating, based on monitoring the one or more threads, energy efficiency information corresponding to the delegation model, wherein updating the delegation model comprises updating the delegation model based on the energy efficiency information.

17. One or more non-transitory computer-readable media storing instructions that, when executed by a computing device comprising at least one processor, a communication interface, and memory, cause the computing device to:

train, based on historical event processing information, a delegation model, wherein the training the delegation model configures the delegation model to output event pools based on input of event processing traffic information;

receive, from a user device, event processing traffic information;

generate, based on inputting the event processing traffic information into the delegation model, an event pool, wherein the event pool comprises:

a plurality of tasks required to fulfill one or more event processing requests corresponding to the event processing traffic information; and a plurality of indicators of applications corresponding to the plurality of tasks;

receive, from a server, an event processing request, an indication of an application corresponding to the event processing request, and event pool information corresponding to the event processing request;

cause, based on inputting the event pool information into the application, the application to identify one or more thread requirements;

allocate, based on the one or more thread requirements, resources to one or more threads;

delegate, based on the allocating, at least one task of the plurality of tasks; and update, based on monitoring the one or more threads, the delegation model.

18. The one or more non-transitory computer-readable media of claim 17, wherein generating the event pool comprises:

generating, using the delegation model and based on the event processing traffic information, predicted load information; and identifying, based on the predicted load information, a plurality of applications for fulfilling the one or more event processing requests.

19. The one or more non-transitory computer-readable media of claim 17, storing instructions that, when executed, further cause the computing device to:

embed, in the application corresponding to the event processing request, an artificial intelligence listener component; and cause, based on the historical event processing information, the application to train the artificial intelligence listener component to output thread requirements based on input of event pool information, wherein causing the application to identify the one or more thread requirements comprises inputting the event pool information into the artificial intelligence listener component.

20. The one or more non-transitory computer-readable media of claim 17, storing instructions that, when executed, further cause the computing device to:

identify, based on the monitoring the one or more threads, a status for at least one thread of the one or more threads, wherein the status indicates whether the at least one thread is active and whether the at least one thread comprises unused resources; and based on identifying that the at least one thread is active and comprises unused resources, resize the at least one thread, or based on identifying that the at least one thread is inactive, dispose of one or more resources corresponding to the at least one thread.

* * * * *